United States Patent [19]

Matsubara

[11] Patent Number: 5,522,030
[45] Date of Patent: May 28, 1996

[54] FAULT CONTROL SYSTEM FOR COMMUNICATIONS BUSES IN MULTI-PROCESSOR SYSTEM

[75] Inventor: Takashi Matsubara, Kawasaki, Japan

[73] Assignee: Fujitsu Limited, Kawasaki, Japan

[21] Appl. No.: 418,154

[22] Filed: Apr. 6, 1995

Related U.S. Application Data

[63] Continuation of Ser. No. 961,296, Oct. 15, 1992, abandoned.

[30] Foreign Application Priority Data

Oct. 16, 1991 [JP] Japan ................................ 3-267451

[51] Int. Cl.[6] .................................................. G06F 11/10
[52] U.S. Cl. .............................. 395/182.02; 395/182.11; 395/200.21
[58] Field of Search ........................... 395/182.02, 182.1

[56] References Cited

U.S. PATENT DOCUMENTS

| | | | |
|---|---|---|---|
| 5,202,980 | 4/1993 | Morita et al. | 371/8.1 |
| 5,307,481 | 4/1994 | Shimazaki et al. | 371/9.1 |

FOREIGN PATENT DOCUMENTS 197044  10/1985  Japan.

OTHER PUBLICATIONS

*Computer Architecture and Organization* Second Edition by John P. Hayes ©1988 by McGraw–Hill Inc. pp. 664–670.
*An Introduction to Operating Systems* Second Edition by Harvey M. Deitel, ©1990 by Addison–Wesley Publishing Co. p. 536.
*Operating Systems Concepts Third Edition* by Abraham Silberschatz ©1991 by Addison–Wesley Publishing Co. pp. 438, 439.

*Primary Examiner*—Vincent P. Canney
*Attorney, Agent, or Firm*—Armstrong, Westerman, Hattori, McLeland & Naughton

[57] ABSTRACT

A fault control system for a multi-processor system in which a plurality of processors are connected to each other via first and second communications buses, including a plurality of stations provided in the first communications bus and respectively connected to the processors. A supervisory station function unit, which is provided in each of the stations, supervises a state of the first communications bus. An ordinary station function unit, which is provided in each of the stations, establishes an interface between the processors and the first communications bus. One of the stations functions as a supervisory station in which only the supervisory station function unit is activated, and remaining stations respectively function as ordinary stations in which only the respective ordinary station function units are activated. A control unit, which is provide in one of the processors, activates the supervisory stations function unit provided in one of the remaining stations, and disables the supervisory station function unit provided in the supervisory station when a fault has occurred in the supervisory station.

10 Claims, 8 Drawing Sheets

MPR: MAIN PROCESSOR
CPR: CALL PROCESSOR
RBU: RING-BUS INTERFACE UNIT

: SUPERVISORY STATION

FIG.5A

F: 0/1 = ORDINARY STATION CONTROL PROCESSOR
/SUPERVISORY STATION CONTROL PROCESSOR

FIG.5B

PROC: NUMBER OF NEXT PROCESSOR TO OPERATE AS
SUPERVISORY STATION CONTROL PROCESSOR

FIG.5C

PROC: NUMBER OF PROCESSOR OPRATING
STATION CONTROL PROCESSOR AT PRESENT

FAULT CONTROL SYSTEM FOR COMMUNICATIONS BUSES IN MULTI-PROCESSOR SYSTEM

This application is a continuation of application Ser. No. 08/961,296 filed Oct. 15, 1992, now abandoned.

BACKGROUND OF THE INVENTION

1. Field of the Invention

The present invention generally relates to a multi-processor system having a plurality of processors connected to duplicated ring-type communications buses, and more particularly to a fault control system for such communications buses.

2. Description of the Related Art

A multi-processor system is known in which a plurality of processors are coupled to duplicated ring-type or bus-type communications buses via adapters (hereinafter referred to as stations). Generally, a single supervisory station having a supervisory function, and a plurality of supervised stations are provided in each of the ring-type communication buses. If a fault has occurred in one of the supervised stations, the station in which the above fault has occurred must be disconnected from the communications buses. If a fault has occurred in the supervisory station, the supervisory function is lost.

Figure 1A:
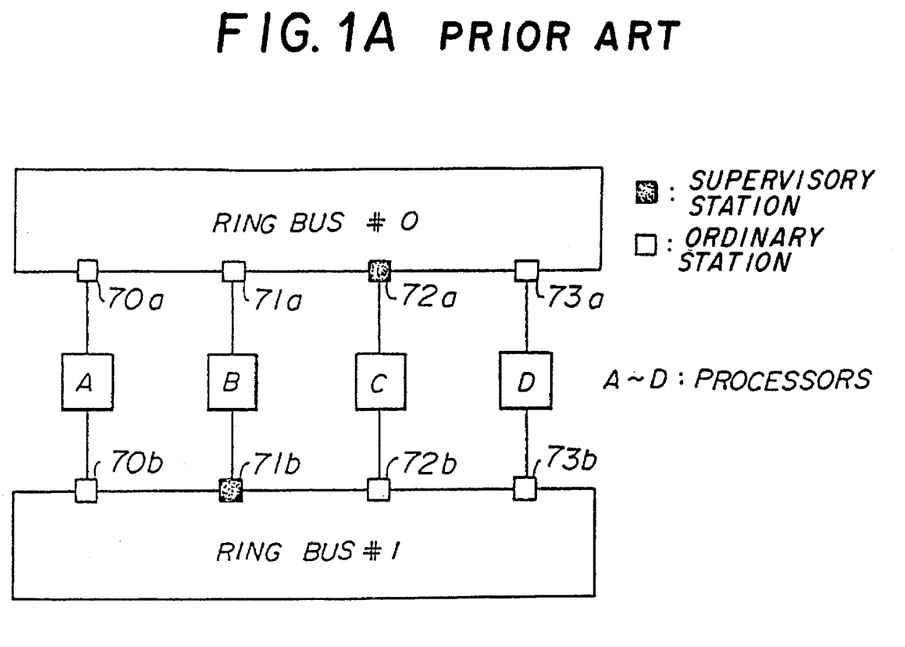
FIGS. 1A and 1B are block diagrams of a conventional multi-processor system.

FIG. 1A is a block diagram of a conventional multi-processor system, which comprises two ring-type communication buses #0 and #1, and processors A, B, C and D. Bus adapters (hereinafter referred to as stations) $70a$, $71a$, $72a$ and $73a$ are provided in the ring bus #0, and bus adapters (stations) $70b$, $71b$, $72b$ and $73b$ are provided in the ring bus #1. When there is no fault, the processors A–D respectively execute load-decentralized processes, such as control of an exchange. Data, status information and instructions are transferred between the processors A–D via the stations and the ring buses #0 and #1. During this operation, the processors A–D respectively use both the ring buses #0 and #1 so that transfer of information is decentralized. In this case, the ring buses #0 and #1 are selectively used on the basis of the types of pieces of information.

The bus ring #0 has a single supervisory station, and a plurality of supervised stations. In FIG. 1A, the station $72a$ functions as a supervisory station. Similarly, the ring bus #1 has a single supervisory station, and a plurality of supervised stations. In FIG. 1A, the station $71b$ functions as a supervisory station.

The supervisory stations respectively provided in the ring buses #0 and #1 have the following three functions. The first supervisory function supervises the configurations of the ring buses #0 and #1. More particularly, topology information, address information, and control parameters regarding the ring buses #0 and #1 are supervised. The second supervisory function periodically gathers pieces of statistical information and traffic information concerning the ring buses #0 and #1. The third supervisory function executes a manual reconfiguration process and a remote test process. More particularly, arbitrary stations are instructed to operate a predetermined process, and a predetermined remote test is carried out for arbitrary stations.

If one of the supervisory stations does not execute the above supervisory functions because of a fault which has occurred therein, the supervisory functions are lost.

Figure 1B:
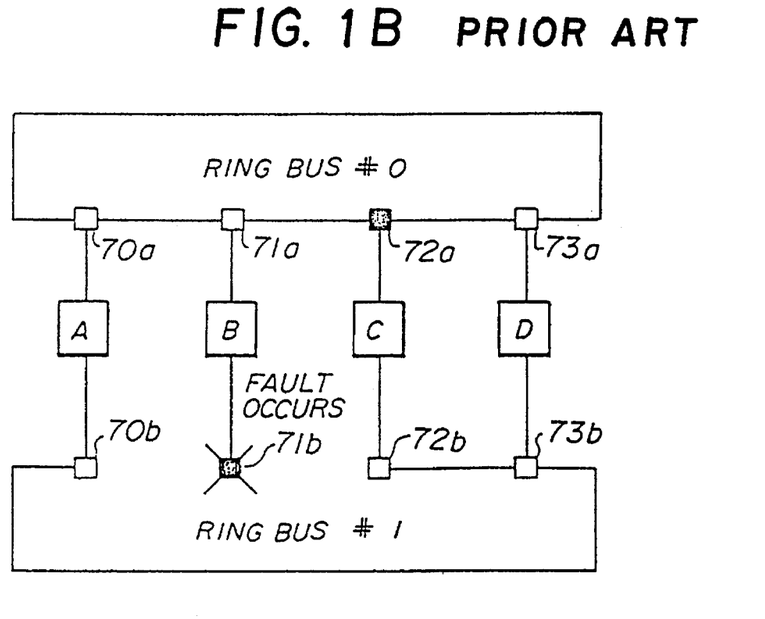

FIG. 1B shows a state of the multi-processor system in which a fault has occurred in the supervisory station $71b$ connected to the ring bus #1 and the processor B. The supervised stations $70b$ and $72b$ adjacent to the supervisory station $71b$ respectively execute a loop-back operation, in which the supervisory station $71b$ is disconnected from the ring bus #1 and a bus loop including the stations $70b$, $72b$ and $73b$ is formed. It will be noted that the solid lines indicating the ring buses #0 and #1 respectively include up and down bus lines in practice.

Since the supervisory station $71b$ is disconnected from the ring bus #1, the above-mentioned first through third supervisory functions for the ring bus #1 cannot be performed, and the ring bus #1 cannot continue to operate normally. It will be noted that the first through third supervisory functions for the ring bus #0 continue to operate irrespective of the occurrence of a fault in the supervisory station $71b$ because the supervisory station $72a$ continues to operate normally.

SUMMARY OF THE INVENTION

It is a general object of the present invention to provide a fault control system for a multi-processor system in which the above disadvantage is eliminated.

A more specific object of the present invention is to provide a fault control system in which if a fault has occurred in a supervisory station, another station can function as a supervisory station in order to continue to supervise a communications bus system.

The above objects of the present invention are achieved by a fault control system for a multi-processor system in which a plurality of processors are connected to each other via first and second communications buses, the fault control system comprising: a plurality of stations provided in the first communications bus and respectively connected to the processors; supervisory station function means, provided in each of the stations, for supervising a state of the first communications bus; ordinary station function means, provided in each of the stations, for establishing an interface between the processors and the first communications bus, one of the stations functioning as a supervisory station in which both the supervisory station function means and the ordinary station function means are activated, and remaining stations respectively functioning as ordinary stations in which only the ordinary station function means is activated; and control means, provided in one of the processors, for activating the supervisory station function means provided in one of the remaining stations and for disabling the supervisory station function means provided in the supervisory station when a fault has occurred in the supervisory station.

BRIEF DESCRIPTION OF THE DRAWINGS

Other objects, features and advantages of the present invention will become more apparent from the following detailed description when read in conjunction with the accompanying drawings, in which.

DESCRIPTION THE PREFERRED EMBODIMENTS

Figure 2:
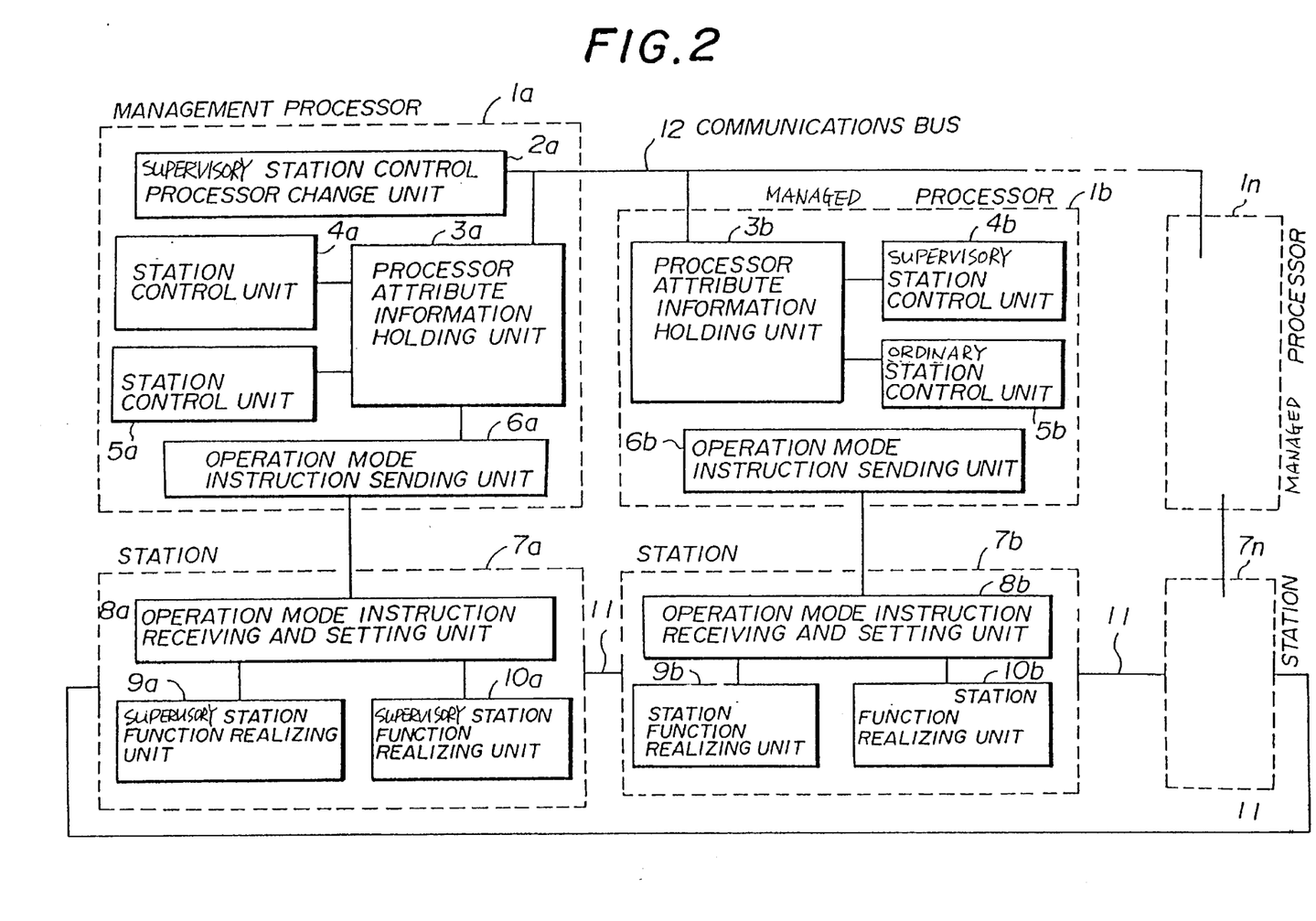
FIG. 2 is a block diagram illustrating an overview of an embodiment of the present invention.
Figure 3A:
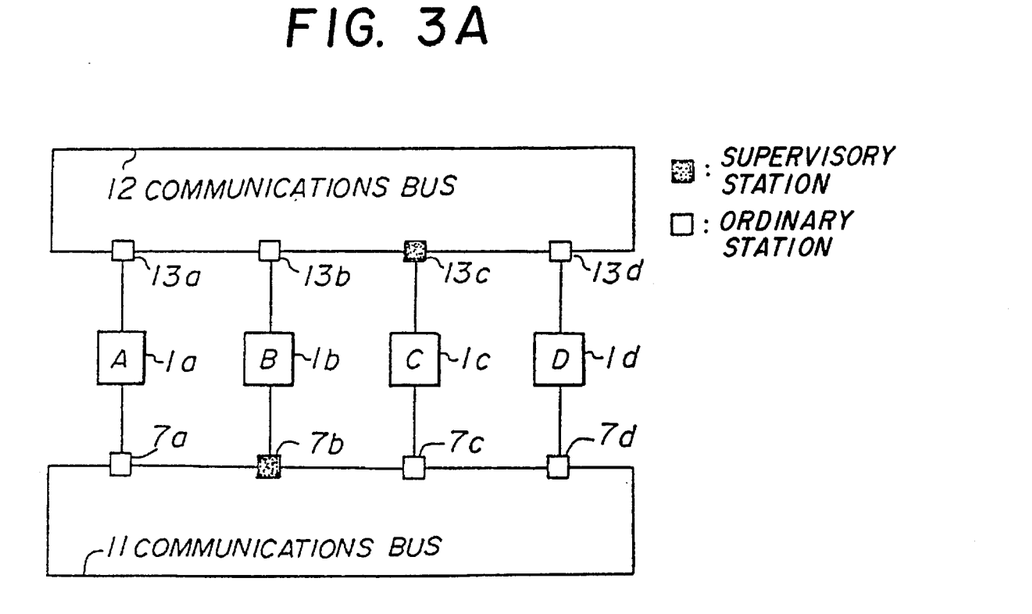
FIGS. 3A and 3B are block diagrams showing the operation of the system shown in FIG. 2.
Figure 3B:
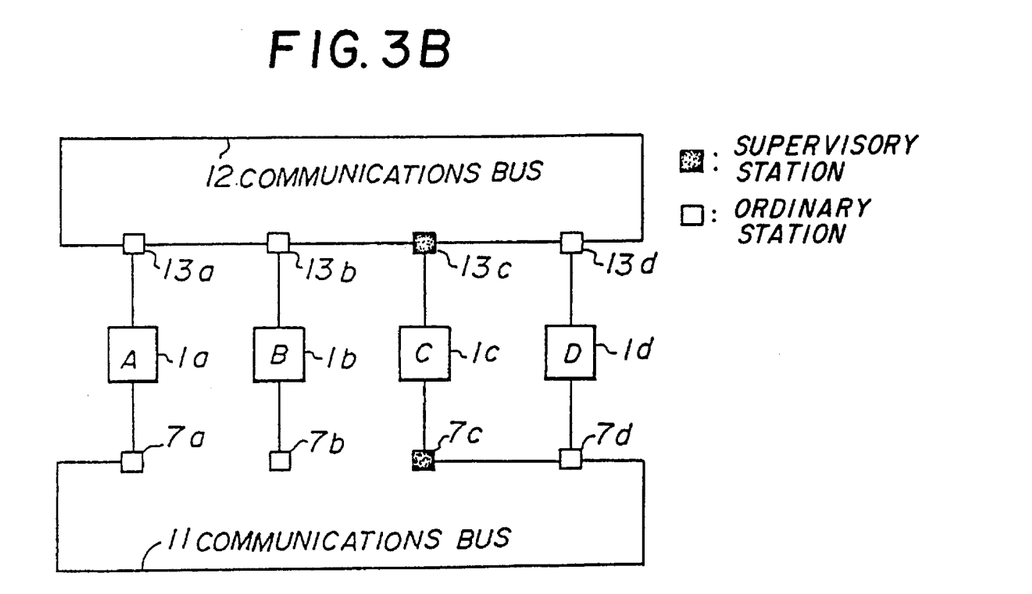

FIG. 2 is a block diagram showing an overview of an embodiment of the present invention, and FIGS. 3A and 3B are block diagrams showing the operation of the embodiment shown in FIG. 2. A multi-processor system shown in FIG. 2 comprises a management processor 1a, managed processors 1b–1n, stations (communications adapters) 7a, 7b, . . . , 7n, and communications buses 11 and 12.

The management processor 1a manages a communications bus system including the communications buses 11 and 12. The management processor 1a comprises a supervisory station control processor change unit 2a, a processor attribute information holding unit 3a, a supervisory station control unit 4a, ordinary station control unit 5a, and an operation mode instruction sending unit 6a. The supervisory station control processor change unit 2a makes a processor related to one of the ordinary stations operate as a supervisory station control processor when the current supervisory station cannot operate because of a fault and the above one of the ordinary stations is made to operate as a supervisory station. The processor attribute information holding unit 3a holds processor attribute information showing that the station 7a connected to the management processor 1a should be operated as an ordinary station or a supervisory station. The supervisory station control unit 4a makes the station 7a (a subordinate station) connected to the management processor 1a operate as a supervisory station. The supervisory station control unit 5a makes the subordinate station 7a operate as an ordinary station. The operation mode instruction sending unit 6a sends the subordinate station 7a an operation mode instruction signal. Each of the other supervised processors 1b–1n, which have subordinate stations 7b–7n, respectively, has the same configuration as the management processor 1a except for the supervisory station control processor change unit 2a.

The station 7a comprises an operation mode instruction receiving and setting unit 8a, a supervisory station function realizing unit 9a, and an ordinary station function realizing unit 10a. The station 7b comprises an operation mode instruction receiving and setting unit 8b, a supervisory station function realizing unit 9b, and an ordinary station function realizing unit 10b. The other stations are configured in the same manner as the stations 7a and 7b. The communications bus 11 of a ring bus type connects the stations 7a–7n to each other. The communications bus 12 connects the management processor 1a and the supervised processors 1b–1n to each other. It is possible to form the communications bus 12 in a ring shape and provide a plurality of stations connected to each other via the communications bus 12. The supervisory station function realizing unit 9a executes the aforementioned supervisory functions. The ordinary station function realizing unit 10a executes an operation or request instructed by the supervisory station.

The operation of the system shown in FIG. 2 will now be described with reference to FIGS. 3A and 3B. In FIGS. 3A and 3B, four processors 1a–1d are provided. Stations 7a–7d are connected to each other via the communications bus 11, and stations 13a–13d are connected to each other via the communications bus 12. FIG. 3A shows a state of the system in which no fault has occurred, and FIG. 3B shows a state in which a fault has occurred in the station 7b.

In FIG. 3A, the processor 1a functions as a management processor, and the station 7b functions as a supervisory station which supervises the communications bus 11. If the supervisory station 7b does not continue to operate because of a fault which has occurred therein, the processor 1b managed by the management processor 1a cannot use the communications bus 11. Hence, the processor 1b informs the management processor 1a of the above fact via the communications bus 12. The management processor 1a is informed of the occurrence of a fault in the supervisory station 7b, and activates the supervisory station control processor change unit 2a. Then, the unit 2a selects one of the processors 1b–1d, for example, the processor 1c, and sends the processor 1c an instruction signal which makes the processor 1c operate as a supervisory station control processor for supervising the stations connected to the communications bus 11.

In response to receipt of the instruction signal, the processor attribute information holding unit 3c (not shown in FIGS. 3A and 3B) of the processor 1c holds processor attribute information showing that the processor 1c functions as a supervisory station control processor, and the supervisory station control unit 4c of the processor 1c is activated. Hence, the processor 1c operates as a supervisory station control processor. The operation mode instruction sending unit 6c (not shown) of the processor 1c sends the subordinate station 7c an operation mode instruction signal which shows that the subordinate station 7c operates as a supervisory station.

The operation mode instruction signal activates the supervisory station function realizing unit 9c of the supervisory station 7c, which disables the ordinary station function realizing unit 10c. Thereby, the station 7c starts to operate as a supervisory station. The state of the system obtained at that time is shown in FIG. 3B. The management processor 1a sends, via the communications bus 12, the previous management processor 1b an instruction signal which makes the processor 1b operate as an ordinary station control processor. Then, the processor attribute information holding unit 3b of the processor 1b holds processor attribute information showing the processor 1b is an ordinary station control processor. Further, the supervisory station control unit 4b is disabled, and the ordinary station control unit 5b is enabled.

Figure 4:
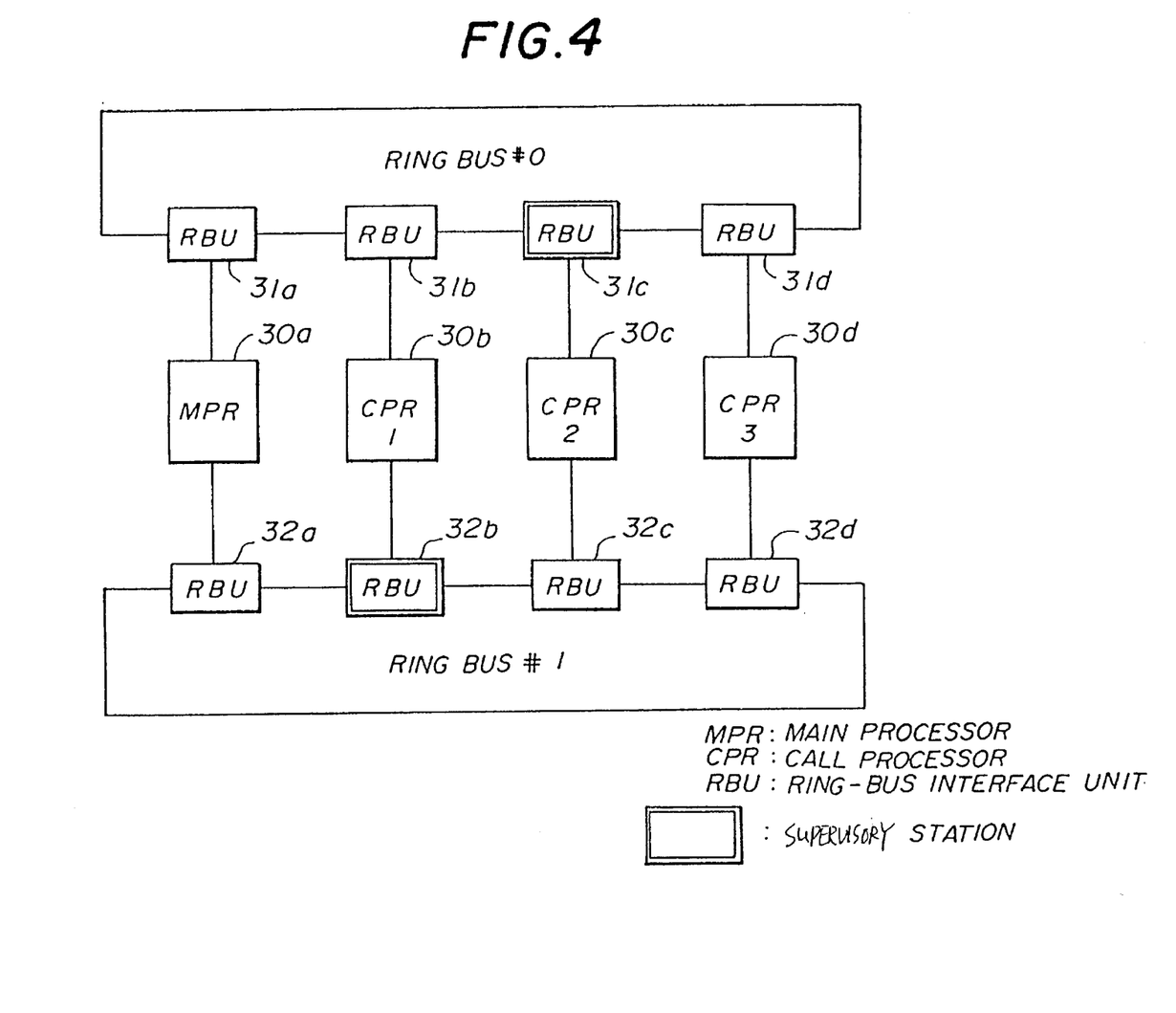
FIG. 4 is a block diagram of a multi-processor exchange system to which the present invention is embedded.
Figure 5A:
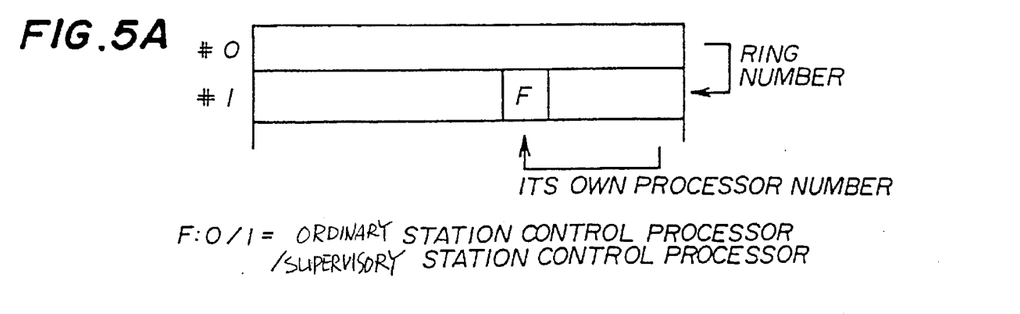
FIGS. 5A, 5B, 5C and 5D are diagrams showing information handled in the embodiment shown in FIG. 2.
Figure 5B:
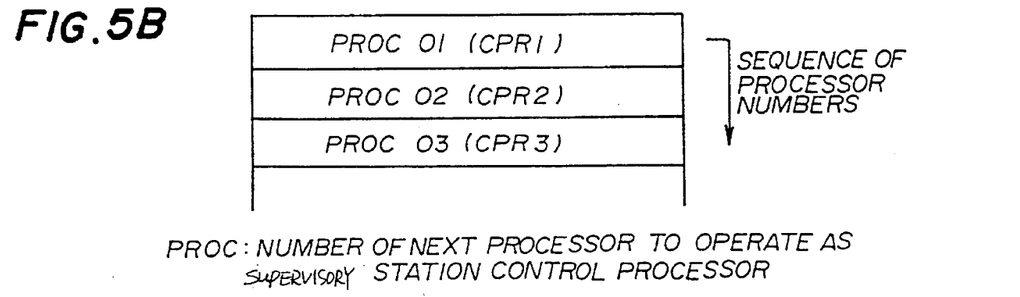
Figure 5C:
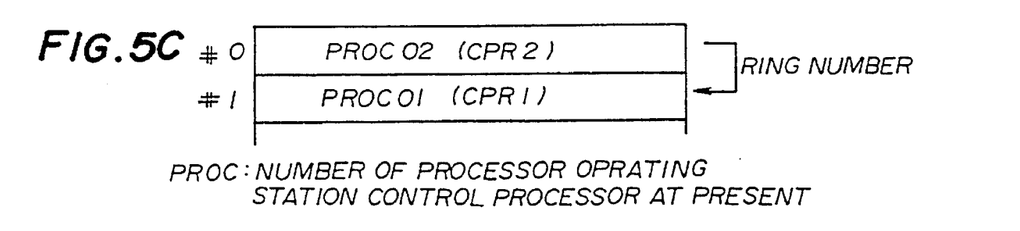
Figure 5D:
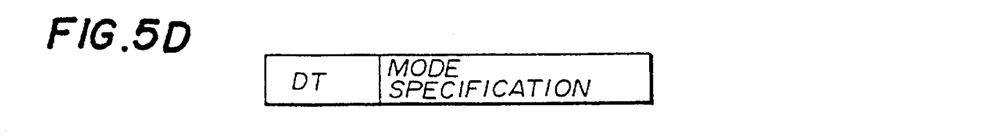
Figure 6:
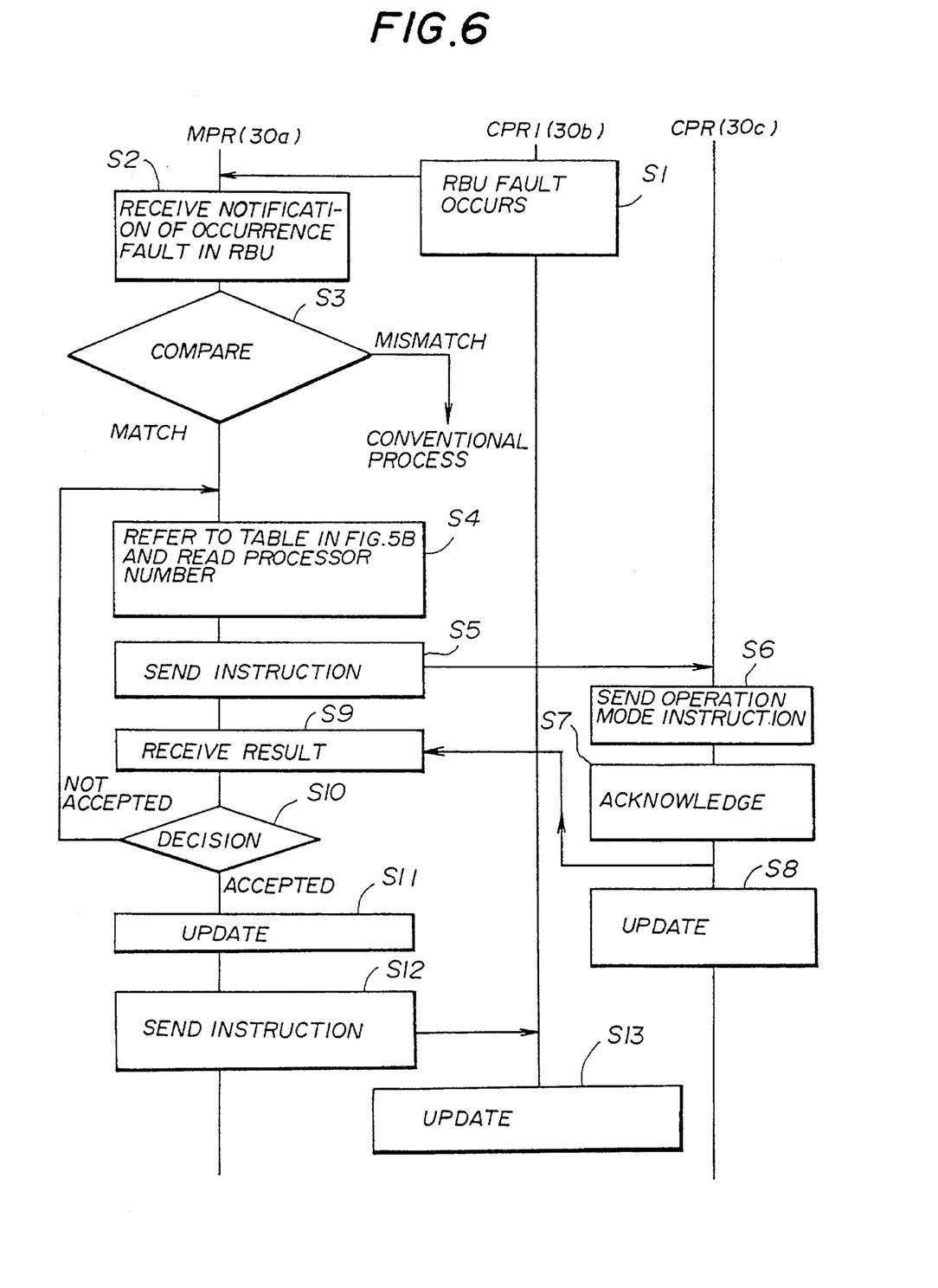
FIG. 6 is a flowchart showing the operation of the embodiment shown in FIG. 2.
Figure 7:
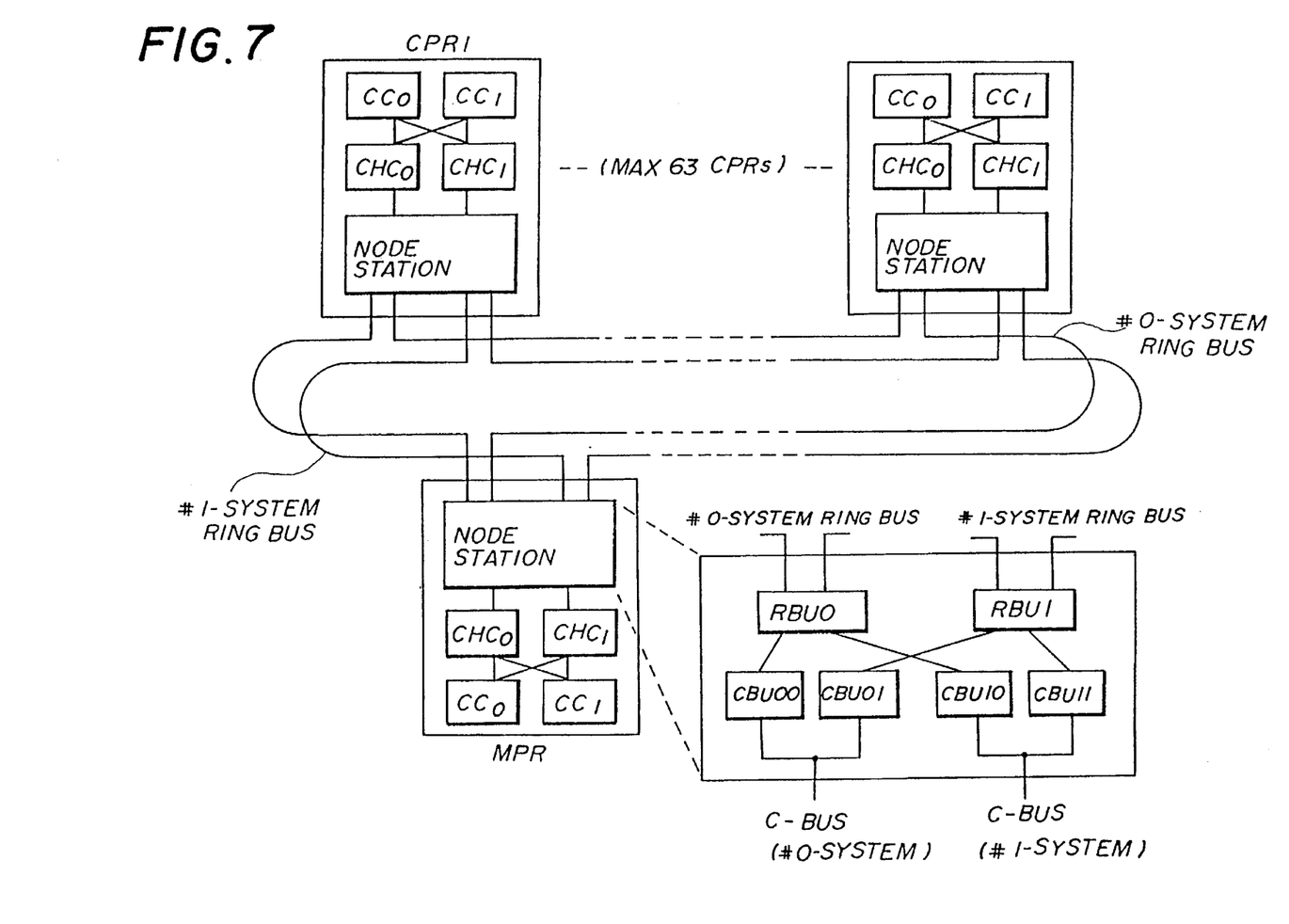
FIG. 7 is a block diagram of an exchange system to which the present invention is applied.

FIG. 4 is a block diagram of a multi-processor exchange system in which the present invention is embedded, FIGS. 5A through 5D are diagrams showing pieces of information managed by each of the processors, FIG. 6 is a flowchart showing the operation of the multi-processor exchange system shown in FIG. 4, and FIG. 7 is a block diagram of an application of the present invention.

The system shown in FIG. 4 includes processors 30a–30d. The processor 30a is a main processor 30a (MPR), and the processors 30b (CPR1), 30c (CPR2) and 30d (CPR3) are respectively call processors. The main processor 30a manages and controls the whole system, and the call processors 30b–30d respectively process distributed calls. The main processor 30a corresponds to the aforementioned management processors, and the call processors 30b–30d correspond to the managed processors.

The system shown in FIG. 4 includes ring buses #0 and #1. The ring bus #0 mutually connects ring-bus interface units (RBU) 31a–31d, which respectively serve as bus adapters. The ring bus #1 mutually connects ring-bus interface units 32a–32d, which respectively serve as bus adapters.

In the state shown in FIG. 4, the ring-bus interface unit 31c under the control of the call processor 30c functions as a supervisory station that supervises the ring bus #0, and the other ring-bus interface units 31a, 31b and 31d respectively function as general units. Further, the ring-bus interface unit 32b under the control of the call processor 30b functions as a supervisory station that supervises the ring bus #1, and other ring-bus interface units 32a, 32c and 32d respectively function as general units.

FIG. 5A shows a processor attribute information holding table provided in each of the processors 30a–30d. The table shown in FIG. 5A has two rows of bits respectively related to the ring numbers of the two ring buses #0 and #1. The bit positions in each of the two rows corresponds to the processor numbers for identifying the processors 30a–30d. The right-hand end position of each of the two rows corresponds to the 0-bit position. In the processors 30a–30d, F bits are written into the bit positions in each of the rows corresponding to their own processor numbers. When the F bit is equal to "0", the processor corresponding to the bit position at which the above F bit is stored functions as an ordinary station control processor. When the F bit equal to "1", the processor corresponding to the bit position at which the above F bit is stored functions as a supervisory station control processor.

FIG. 5B shows a supervisory station control processor change table, which is provided in the management processor (main processor 30a in the case shown in FIG. 4). The table shown in FIG. 5B stores a sequence of processor numbers indicating the next processor to be made to operate as a supervisory station control processor when the current supervisory station ceases to operate as a supervisory station. In the case shown in FIG. 5, the processor numbers CPR1, CPR2 and CPR3 are stored in the table in that order. If a fault has occurred in the station controlled by the call processor CPR2 which is now operating as a supervisory station control processor, the call processor CPR3 is made to operate as a supervisory station control processor in lieu of the processor CPR2.

FIG. 5C shows a supervisory station control processor number holding table, which is provided in the management processor 30a. The table shown in FIG. 5C shows two storage areas respectively related to the ring buses #0 and #1. The two storage areas respectively store the processor numbers of the processors which are now operating as supervisory station control processors in the ring buses #0 and #1. In the case shown in FIG. 5C, the processor 30c (CPR2) is a supervisory station control processor for the ring bus #0, and the processor 30b (CPR1) is a supervisory station control processor for the ring bus #1.

FIG. 5D shows a format of the aforementioned operation mode instruction signal, which is sent to the supervised processors 30b–30d from the management processor 30a. The operation mode instruction signal includes data DT instructing a change of the operation mode, and data namely the operation mode indicating control of a supervisory station or of an ordinary station.

A description will now be given, with reference to FIGS. 6 and 7, of the operation of the system. It will now be assumed that a fault has occurred in the ring-bus interface unit 32b connected to the ring bus #1 and controlled by the call processor 30b. The ring-bus interface units 32a and 32c adjacent to the unit 32b carry out a loop-back operation so that the ring bus #1 is folded back at the units 32a and 32c. Thereby, the defective unit 32b is physically disconnected from the ring bus #1. The call processor 30b cannot use the ring bus #1, and therefore notifies the main processor 30a of the occurrence of a fault in the ring-bus interface unit 32b via the ring bus #0 (step S1 in FIG. 6).

In response to receipt of the above notification from the call processor 30b (step S2), the main processor 30a obtains data indicating the current supervisory station control processor number by accessing the supervisory station control processor number holding table shown in FIG. 5 using the number of the ring to which the station having a fault is connected. Then, the main processor 30a compares the processor number of the processor 30b (which is a source station of the above notification) with the readout processor number (step S3). If the two processor numbers do not coincide with each other, the main processor 30a recognizes that the station in which the fault has occurred is an ordinary station. In this case, a conventional predetermined process is carried out. For example, the defective station is kept disconnected from the ring without providing an alternative station.

In the case shown in FIG. 5C, the number of the defective station coincides with the number of the supervisory station for the ring bus #1. Then, the supervisory station control processor change table shown in FIG. 5B is accessed using the above processor number, and the number of the next supervisory station control processor is obtained therefrom (step S4). In the case shown in FIG. 5B, the next supervisory station control processor is the processor 30c (CPR2). Then, the main processor 30a sends the processor 30c the instruction signal which makes the processor 30c a supervisory station control processor (step S5). The above instruction signal has the format shown in FIG. 5D.

In response to receipt of the above instruction signal, the call processor 30c sends the ring-bus interface unit 32c the operation mode instruction signal which indicates that the unit 32c should operate as a supervisory station (step S6). Then, the call processor 30c receives an acknowledgement signal from the ring-bus interface unit 32c, and sends the main processor 30a information showing whether or not the operation mode instruction has been duly accepted (step S7). Then, the processor 30c, which is now the supervisory station control processor, writes, into the processor attribute information holding table shown in FIG. 5A, information showing that the processor 30c is a supervisory station control processor (step S8).

In response to receipt of the above operation mode instruction signal, the ring-bus interface unit 32c, which is the subordinate station of the call processor 30c, activates the supervisory function, and sends an acknowledgement signal to the call processor 30c. From then on, the unit 32c operates as a supervisory station.

The main processor 30a receives the information sent from the call processor 30c in step S7 (step S9), and determines whether or not the switching of the supervisory station control processor has been successfully made (step S10). If the switching of the supervisory station control processor has failed, the main processor 30a executes step S4 again. That is, the steps S4–S10 are repeatedly carried out until the switching of the supervisory station control processor is successively completed. When the switching is successful, the main processor 30a updates the supervisory station control processor number holding table shown in FIG. 5C so that the number of the call processor 30c is written therein (step S11). Further, the main processor 30a sends the previous supervisory station control processor an instruction which makes the call processor 30b operate as a general processor (step S12).

In response to receipt of the above instruction, the call processor 30b updates the processor attribute information holding table shown in FIG. 5A so that information, showing the call processor 30b is a general processor, is written therein (step S13). From then on, the call processor 30b operates as a general processor.

FIG. 7 shows an application of the present invention. More particularly, the system shown in FIG. 7 is an exchange system having a duplicated optical ring-bus system. The system shown in FIG. 7 includes 64 processors, which consists of a main processor MPR and 63 call processors CPR1–CPR63. Each of the 64 processors comprises a duplicated system, which comprises two central processing units CC0 and CC1, and channel control units CHC0 and CHC1. The duplicated system of each of the 64 processors is connected, via a node station, to optical communication bus ring buses #0 and #1, which forms the duplicated optical ring-bus system.

The node station is configured, as shown in FIG. 7. A ring-bus interface unit RBU0 is connected to the ring bus #0, to which a C-bus interface unit CBU00 is connected. A C-bus of the #0-system, which is coupled to the channel control unit CHC0 and the central processing unit CC0 of the #0-system, is connected to the C-bus interface unit CBU00. Further, a C-bus interface unit CBU10 of the #1-system is connected to the ring-bus interface unit RBU0 of the #0-system. A C-bus of the #1-system, which is coupled to the channel control unit CHC1 and the central processing unit CC1 of the #1-system, is connected to the C-bus interface unit CBU10. Further, the node station comprises a ring-bus interface unit RBU1 connected to the ring bus #1. A C-bus interface unit CBU01 of the #0-system and a C-bus interface unit CBU11 of the #1-system are connected to the ring-bus interface unit RBU1. The C-bus interface units CBU01 and CBU11 are connected to the C-buses of the #0-system and the #1-system, respectively. The ring-bus interface units RBU0 of the node stations correspond to stations connected to the ring bus #0, such as stations 31a–31d, and the ring-bus interface units RBU1 thereof correspond to stations connected to the ring bus #1, such as stations 32a–32d. One of the ring-bus interface units RBU0 in the #0-system functions as a supervisory station, and one of the ring-bus interface units RBU1 in the #1-system functions as a supervisory station.

One of the two processors CC0 and CC1 can access both the ring buses #0 and #1 via the ring-bus interface units RBU0 and RBU1. That is, either the processor CC0 or CC1 is an active processor. If a fault has occurred in either the processor CC0 or CC1, the other processor is made to operate as an active processor. The operation of the system shown in FIG. 7 except for the switching between the processors CC0 and CC1 is the same as the operation of the embodiment which has been described with reference to the previous figures.

Figure 8:
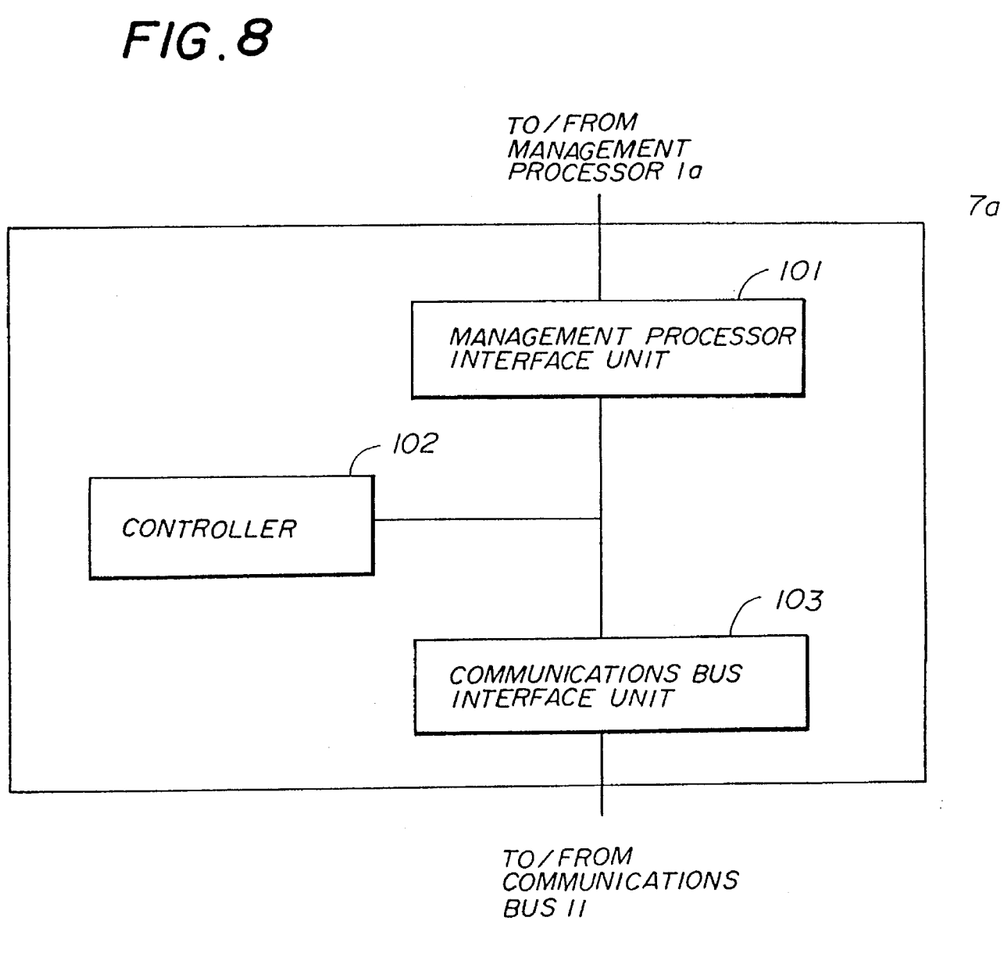
FIG. 8 is a block diagram of the hardware structure of each station shown in FIG. 2.

FIG. 8 is a block diagram of the station 7a connected to the ring-type communications bus 11 shown in FIG. 2. The other stations 7b–7n are configured in the same manner as shown in FIG. 8. The station 7a comprises a management processor interface unit 101, a controller 102, and a communications bus interface unit 103. The station 7a is connected to the management processor 1a via the management processor interface unit 101, and is connected to the communications bus 11 via the communications bus interface unit 103. The controller 102, formed with, for example, a microprocessor, controls the entire operation of the station 7a. More particularly, the controller realizes the blocks 8a, 9a and 10a shown in FIG. 2.

The present invention is not limited to the specifically disclosed embodiments, and variations and modifications may be made without departing from the scope of the present invention.

What is claimed is:

1. A fault control system for a multi-processor system in which a plurality of processors including one management processor are connected to each other via first and second communications buses, said fault control system comprising:

a plurality of stations provided in the first communications bus and respectively connected to the processors;

a plurality of stations provided in the second communications bus and respectively connected to the processors;

supervisory station function means, provided in each of the stations, for supervising a state of the first and second communications buses;

ordinary station function means, provided in each of the stations, for establishing an interface between the processors and the first and second communications buses, one of the stations in each of said first and second communication buses functioning as a supervisory station in which only the supervisory station function means is activated, and remaining stations respectively functioning as ordinary stations in which only the ordinary station function means is activated; and control means provided in said management processor for activating the supervisory station function means provided in one of the remaining stations via the processor connected to said remaining station and for disabling the supervisory station function means provided in said supervisory station via the processor connected to said supervisory station when a fault has occurred in the supervisory station, wherein said control means is informed of the occurrence of the fault by the processor connected to the supervisory station, and wherein said one of the stations that is connected to the first communications bus and has the activated supervisory station function means and said one of the stations that is connected to the second communications bus and has the activated supervisory station function means always supervise the first and second communications buses, respectively, even if a fault has occurred in another station connected to said first communications bus or said second communications bus, so that communications are always enabled.

2. A fault control system as claimed in claim 1, further comprising:

processor attribute information holding means, provided in each of the processors, for holding attribute information showing whether a corresponding one of the processors should function as a supervisory station control processor for controlling the supervisory station or an ordinary station for controlling a corresponding one of the ordinary stations;

setting means, provided in each of the stations, for setting an operation mode of a corresponding one of the stations to either the supervisory station or the ordinary station on the basis of the attribute information stored in the processor attribute information holding means; and change means, provided in said one of the processors, for updating contents of the processor attribute information holding means in response to the occurrence of a fault in one of the stations.

3. A fault control system as claimed in claim 1, further comprising table means for storing information concerning a sequence of the stations which are sequentially made to operate as supervisory stations, wherein said control means comprises means for accessing said table means in order to determine said one of the remaining stations.

4. A fault control system as claimed in claim 2, further comprising table means, provided in said one of the processors, for storing information concerning a sequence of the stations which are sequentially made to operate as supervisory stations, wherein said control means comprises means for accessing said table means in order to determine said one of the remaining stations.

5. A fault control system as claimed in claim 1, further comprising supervisory station control processor number holding table means, provided in said one of the processors, for storing processor number information showing which one of the processors is a supervisory station control processor for controlling the supervisory station.

6. A fault control system as claimed in claim 2, further comprising supervisory station control processor number holding table means, provided in said one of the processors, for storing processor number information showing which one of the processors is a supervisory station control processor for controlling the supervisory station.

7. A fault control system as claimed in claim 1, wherein said one of the processors is a management processor for managing the remaining processors, and the remaining processors are respectively call processors.

8. A fault control system as claimed in claim 1, wherein the first communications bus is a ring-type communications bus.

9. A fault control system as claimed in claim 1, wherein the first and second communications buses are optical communications buses.

10. A fault control system as claimed in claim 1, wherein each of said processors comprises two central processing units, one of which units is selectively connected to the first communications bus.

* * * * *